(12) United States Patent
Klimek

(10) Patent No.: US 7,753,437 B2
(45) Date of Patent: Jul. 13, 2010

(54) MOTOR VEHICLE WITH A BODY HAVING A FLOOR STRUCTURE AND AT LEAST ONE REINFORCING ELEMENT FOR REINFORCING THE FLOOR STRUCTURE

(75) Inventor: Stanislaw Klimek, Frankfurt am Main (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/997,805

(22) PCT Filed: Aug. 4, 2006

(86) PCT No.: PCT/EP2006/007745

§ 371 (c)(1),
(2), (4) Date: Jul. 23, 2008

(87) PCT Pub. No.: WO2007/017198

PCT Pub. Date: Feb. 15, 2007

(65) Prior Publication Data

US 2008/0315630 A1    Dec. 25, 2008

(30) Foreign Application Priority Data

Aug. 5, 2005 (DE) .................. 10 2005 036 900

(51) Int. Cl.
*B62D 21/15* (2006.01)
(52) U.S. Cl. ............... 296/187.08; 296/187.12; 296/193.07; 296/209
(58) Field of Classification Search ........... 296/187.08, 296/187.12, 193.02, 193.07, 209; 280/784
See application file for complete search history.

(56) References Cited

U.S. PATENT DOCUMENTS

| 4,887,862 | A | | 12/1989 | Bassi |
| 4,955,637 | A | * | 9/1990 | Huber et al. ............. 280/801.1 |
| 5,114,184 | A | * | 5/1992 | Shimomura et al. ......... 280/784 |
| 5,464,266 | A | | 11/1995 | Guertler |
| 5,584,525 | A | * | 12/1996 | Nakano et al. ............. 296/68.1 |
| 5,671,968 | A | * | 9/1997 | Masuda et al. ......... 296/187.12 |
| 6,382,710 | B1 | * | 5/2002 | Funk et al. ............. 296/187.12 |
| 6,604,781 | B2 | * | 8/2003 | Uchida ....................... 296/204 |
| 7,011,359 | B2 | * | 3/2006 | Watanabe et al. ...... 296/187.08 |
| 7,025,412 | B2 | * | 4/2006 | Nakamura et al. ..... 296/193.07 |
| 7,147,272 | B2 | * | 12/2006 | Odaka et al. .......... 296/187.12 |
| 2002/0145307 | A1 | * | 10/2002 | Fujita ......................... 296/193 |
| 2004/0100126 | A1 | * | 5/2004 | Kawabe et al. ......... 296/193.07 |

(Continued)

FOREIGN PATENT DOCUMENTS

| DE | 3137487 A1 | 11/1982 |
| DE | 4211410 A1 | 10/1993 |

(Continued)

OTHER PUBLICATIONS

German Patent Office, German Search Report for German Application Number 102005036900.6, Mar. 9, 2006.

*Primary Examiner*—Jason S Morrow
(74) *Attorney, Agent, or Firm*—Ingrassia Fisher & Lorenz, P.C.

(57) ABSTRACT

Motor vehicle with a body having a floor structure and at least one reinforcing element for reinforcing the floor structure, wherein the reinforcing element is designed wave-shaped, wherein the waves run across the vehicle longitudinal axis.

8 Claims, 5 Drawing Sheets

U.S. PATENT DOCUMENTS

| | | |
|---|---|---|
| 2004/0104602 A1 | 6/2004 | Cardimen et al. |
| 2005/0046236 A1 | 3/2005 | Nakamura et al. |
| 2008/0122259 A1* | 5/2008 | Matsui .................. 296/187.12 |
| 2008/0258503 A1* | 10/2008 | Egawa et al. ........... 296/193.07 |
| 2008/0315629 A1* | 12/2008 | Abe et al. .............. 296/193.07 |

FOREIGN PATENT DOCUMENTS

| | | | |
|---|---|---|---|
| DE | 4340346 | A1 | 6/1995 |
| DE | 19709315 | | 7/1997 |
| DE | 10111199 | A1 | 9/2001 |
| DE | 10139268 | A1 | 2/2003 |
| DE | 10302606 | A1 | 8/2003 |
| DE | 10206768 | A1 | 9/2003 |
| DE | 10335541 | | 3/2005 |
| GB | 2089464 | A | 6/1982 |
| JP | 2006151146 | A * | 6/2006 |
| JP | 2006298145 | A * | 11/2006 |
| JP | 2008080893 | A * | 4/2008 |
| JP | 2008100548 | A * | 5/2008 |
| WO | 0145999 | A1 | 6/2001 |

* cited by examiner

US 7,753,437 B2

MOTOR VEHICLE WITH A BODY HAVING A FLOOR STRUCTURE AND AT LEAST ONE REINFORCING ELEMENT FOR REINFORCING THE FLOOR STRUCTURE

CROSS-REFERENCE TO RELATED APPLICATIONS

This application is a U.S. National-Stage entry under 35 U.S.C. §371 based on International Application No. PCT/EP2005/007745, filed Aug. 4, 2006, which was published under PCT Article 21(2) and which claims priority to German Application No. DE 10 2005 036 900.6, filed Aug. 5, 2005.

TECHNICAL FIELD

The invention relates to a motor vehicle with a body having a floor structure and at least one reinforcing element for reinforcing the floor structure.

BACKGROUND

As per legal requirements according to FMVSS214-MY09, the side-pole test results in considerably higher structural requirements in respect of motor vehicles. Accordingly, the pole must not intrude in the vehicle structure more than 220 mm. Such a collision scenario is shown in FIG. 1.

Usual vehicle designs however have intrusion depths of 450 to 500 mm according to this test. Floor structures of such vehicles consist of two cross members which are installed under the front seats of a motor vehicle.

This transverse structure is not suitable for meeting the future requirements in the side-pole impact. Because of low permissible intrusion the structure of the front seats will have little influence on the overall transverse stiffness. The failure of one of the two cross members results in major local intrusions since the remaining structure hardly has any transverse stiffness.

Patent publication DE 43 26 270 shows a motor vehicle with a stiff floor structure wherein several energy-absorbing impact elements are integrated in the lateral body parts over the length of the passenger cell. However, the legally prescribed intrusion cannot be safely attained even with this measure since the effect of the impact elements presupposes a floor structure that is still in tact in each case. Should it prematurely fail during the side impact the impact elements no longer find any support towards the interior space with the consequence of excessive intrusion of the pole.

It is the object of the present invention to provide a vehicle with a stiff floor structure offering increased resistance to laterally acting pole forces which does not bring with it a substantial weight increase of the vehicle and which can be realised easily and cost-effectively.

SUMMARY

This object is solved through a vehicle with a reinforcing element being embodied wave-shaped wherein the waves run across the vehicle longitudinal axis.

An essential point here consists in that such a structure in lateral direction comprises a particularly high shear strength and bending strength and in addition can be easily manufactured for example through cold pressing. The height of the "waves" in this case is designed so that neither the legroom nor the space required for the installation of the ventilation duct is affected.

In an advantageous embodiment of the body of the vehicle the reinforcing elements can be formed as one piece with the floor structure. Such reinforcing can be realised particularly easily from a technical pressing point of view and moreover is cost effective since additional assembly operations and costs for additional parts fall away.

In an alternative further development of the body of the vehicle the reinforcing elements can also be arranged on a body floor inside the vehicle. As a result, reinforcing becomes independent of the thickness of the floor structure and can for example be embodied thicker than said floor structure. It is also possible in principle to provide the reinforcing elements on the body floor outside the vehicle, which however can result in covering problems on the underbody. At the same time embodiment possibilities of the interior space utilising the reinforcing elements fall away as will have to be shown in the following.

Accordingly, the reinforcing elements are preferentially arranged in the seat region, more preferably in the region of the front seats. The two cross members customarily provided under the front seat are replaced in the process by a suitable sandwich design. In this way the particularly endangered sitting positions of the driver and co-driver are specifically protected against lateral impact and weight is saved in other positions.

For improved discharge of the loads introduced in the vehicle structure the reinforcing elements are preferably connected with a body floor located below. Depending on the material of the elements, a connection can be established through gluing, welding, screwing, riveting or the like. Any suitable energy-absorbing material is possible for the elements, more preferably aluminium sheet, steel sheet or (fabric-reinforced) plastic. In principle however moulding of the elements directly on the body floor proper is conceivable, e.g. as wave-shaped structure of the floor panel.

Although the waves can have any suitable cross-sectional profile a profile that is box-shaped in cross-section is preferable. This produces a flat upper and lower installation surface e.g. for a seat or the like.

Transcending such a surface, reinforcements substantially running across the extension direction of the waves can be provided on a reinforcing element. As a result, deformation of the reinforcing element through bending loads which occur during the intrusion of the pole is prevented. As a result, the absorption capability for shear loads is retained for the reinforcing element. Here, the reinforcements can be designed as seat supports on which the slide rails of the seats are mounted.

For improved discharge of the loads introduced in a motor vehicle wherein the floor structure comprises a vehicle tunnel oriented in vehicle longitudinal direction as well as side members formed on both sides on the vehicle, the reinforcing elements extend in a load path between a respective lateral member and the tunnel. Thus a continuous load path between members and tunnel is created, over the length of which the introduced loads can be dissipated. The deformation zones (and thus the energy dissipation zones) in this case are in the region of the members and the tunnel, while the reinforcing elements for the protection of the occupants substantially retain their shape.

A further development of this arrangement provides that the reinforcing elements are fastened on the one side on the tunnel and on the other side/or the lateral member. This securely prevents breaking-out of the elements from the load path.

A particularly shape-retaining connection is created when fastening elements are provided whose profile follows the wave-shaped cross-sectional profile of the reinforcing elements for the uniform transmission of the introduced loads and which are non-positively connected with said profile. Load peaks during force transmission into the elements and in turn from these into the tunnel are thus excluded.

An advantage is created in that in the tunnel an exhaust for absorbing deformation energy is guided. The exhaust in this case absorbs at least a part of the impact loads introduced via the load path side member—reinforcing element—tunnel in that it deforms under these loads.

In order to prevent that the exhaust during a lateral impact is pushed from the load path it is an advantage if a tunnel brace is provided, which is supported by the legs of the tunnel open towards the bottom so that it pushes the exhaust upwards upon deformation of the tunnel. This ensures reliable dissipation of the introduced energy even with major deformation forces.

To additionally increase the stiffness against lateral load introduction both the members as well as the tunnel can be additionally stiffened against lateral impact. This relieves the reinforcing elements and the passengers are protected even better.

The stiffness of the floor structure can be additionally increased in that door sills formed on both sides of the vehicle are stiffened against lateral impact.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
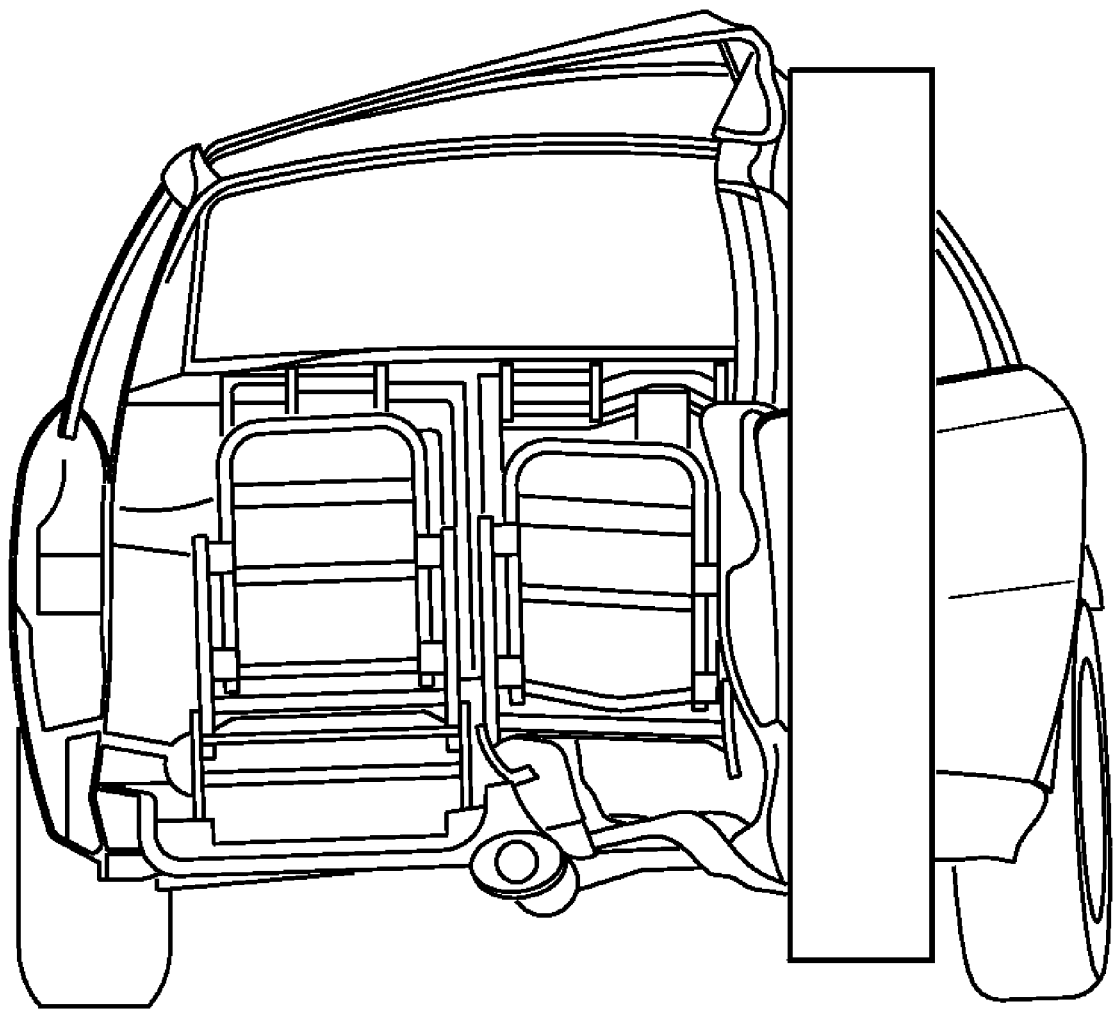
FIG. 1 illustrates a customary vehicle in cross-sectional view that has been subjected to a side-pole test.

FIG. 1 shows a customary vehicle in cross-sectional view that has been subjected to a side-pole test. In the impact region the pole deforms the vehicle and presses the body as far as the (co-driver's) seat region.

Figure 2A:
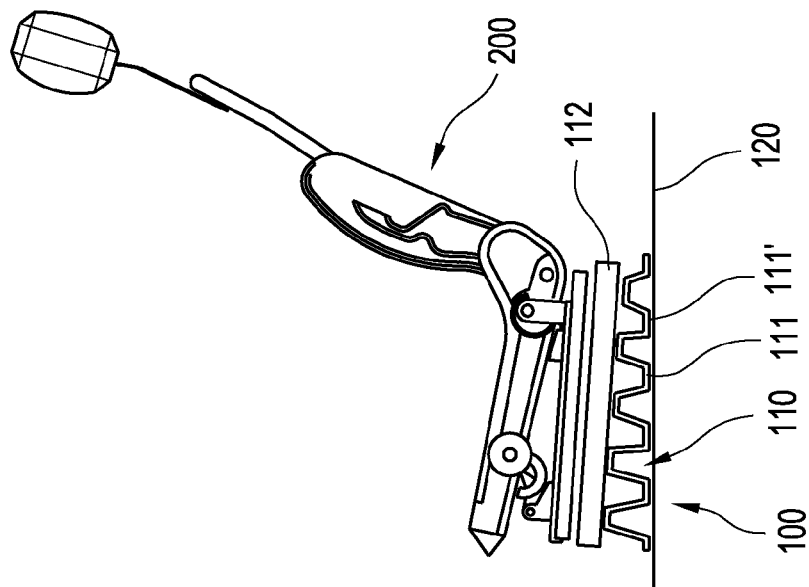
FIG. 2a illustrates a vehicle according to the invention in cross-sectional view with a stiff floor structure, the construction of which under a seat is once more shown in lateral view.
Figure 2A:
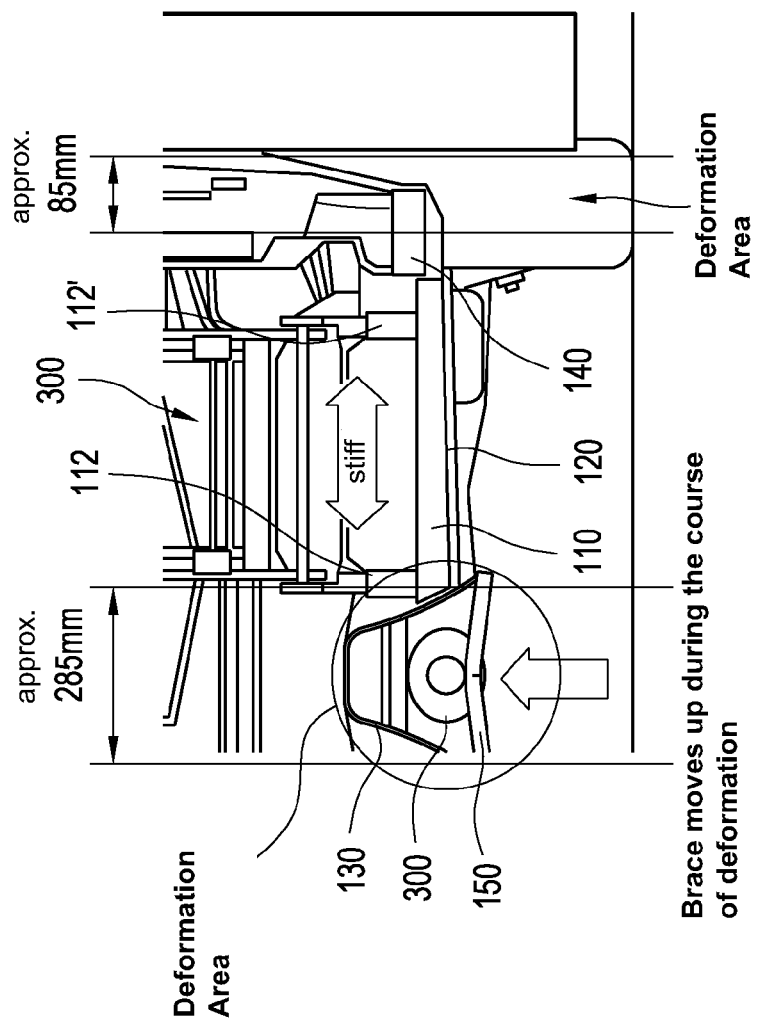

FIG. 2a shows a vehicle according to the invention with a floor structure 100, the construction of which below a seat 200 is once more shown in lateral view. Here, the seat 200 can be a front seat, back seat or the like. A reinforcing element 110 with waves 111, 111' running across the vehicle longitudinal direction in this case has a box-shaped profile, providing a flat surface for the installation of reinforcements 112, 112'. These reinforcements 112, 112' run across the extension direction of the waves 111, 111' and thus provide the reinforcing element 110 with additional rigidity about a torsional axis running in this direction. As a result, the reinforcing element 110 under the load of the impact is unable to escape upwards or downwards or only with difficulty so, with which its orientation against the laterally entering pole and thus its absorptive capacity of shear forces in extension direction of the waves 111, 111' and for bending moments about a torsional axis across the extension direction of the waves 111, 111' is retained. The load absorption capacities of the reinforcing element 110 obtained from the wave-shaped moulding are thus retained. At the same time, through suitable selection of the height of the reinforcements 112, 112', adequate legroom in the rear of the vehicle can be ensured. The slide rails of the seat 200 are mounted on these reinforcements 112, 112'. The reinforcing element 110 in this case can be joined (glued, screwed, riveted or such like) to further improve the shape retention.

The load path provided for transmitting and dissipating the pole forces is obtained from the arrangement of a side member 140 and a vehicle tunnel 130 and the reinforcing element 110 arranged in-between. The deformation regions during the side-pole test are displaced through the reinforcing element 110 to an outer region (85 mm wide) and to a middle region (285 mm wide), by which the seat position is not detrimentally affected. This means that the energy dissipation substantially takes place in the region of the member 140 and in the region of the tunnel 130, while the reinforcing element 110 located in-between remains practically undamaged.

Here, an exhaust 300 is guided in the tunnel 130 which exhaust is utilised for absorbing deformation energy, i.e. can be compressed during a lateral impact. To prevent that the exhaust during a lateral impact is moved from the load path an arched tunnel brace 140 is provided which is supported on both sides by the legs of the tunnel 130. During a lateral impact the reinforcing element 110 is displaced to the left in the direction of the tunnel 130. As a result, said tunnel is deformed, i.e. laterally indented and thus shortened in height. The brace 150 thus migrates upwards and prevents that the exhaust 300 is forced downwards—and thus from the load path.

Figure 2B:
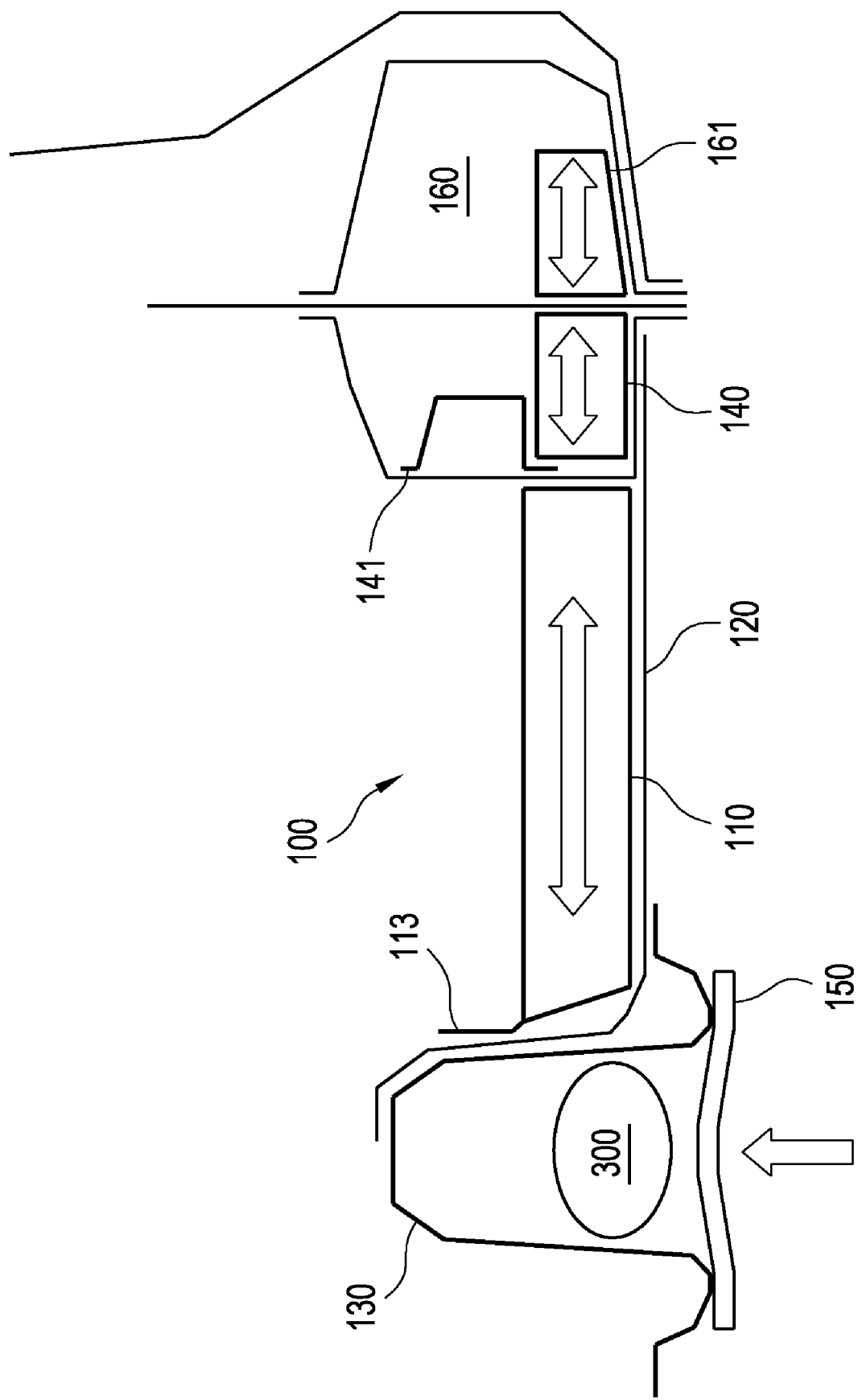
FIG. 2b illustrates the floor structure of the vehicle of FIG. 2a in schematic cross-sectional view for illustrating the position and operating mode of the reinforcing element in the load path.

FIG. 2b shows the floor structure 100 of the vehicle of FIG. 2a in schematic cross-sectional view to illustrate the position and mode of operation of the reinforcing element 110 in the designated load path. The reinforcing element 110 is joined with the body floor 120, arranged in the load path between the side member 140 and the vehicle tunnel 130 and additionally joined with said tunnel via a fastening element 113. This fastening element 113 is optional and can be constructed between tunnel 130 and reinforcing element 110 and/or between member 140 (laterally on the body floor) and reinforcing element 110. In the tunnel 130 the exhaust 300 is guided and during a lateral impact is forced upwards via a brace 150 attached to the tunnel 130 in the manner described above and held in the load path member 140, reinforcing element 110 and tunnel 130. Since the reinforcing element 110 has considerable stiffness the deformations—and thus the load dissipation—thus occur in the region of the tunnel 130 and the member 140. In the region of the tunnel 130 the load dissipation additionally occurs via the compression of the exhaust 300. The seat 200 arranged above the reinforcing element 110 is thus practically not negatively affected. With this embodiment, additional reinforcements 141 and 161 are provided both on the side member 140 as well as in a door sill 160 of the vehicle. The reinforcement 141 of the member 140 is designed as U-profile closed towards the vehicle side, which more preferably protects the wave-shaped basic structure of the member 140 shown in FIG. 2b against bending. The reinforcement 161 of the door sill is designed as box-shaped profile which additionally supports this effect.

Figure 2C:
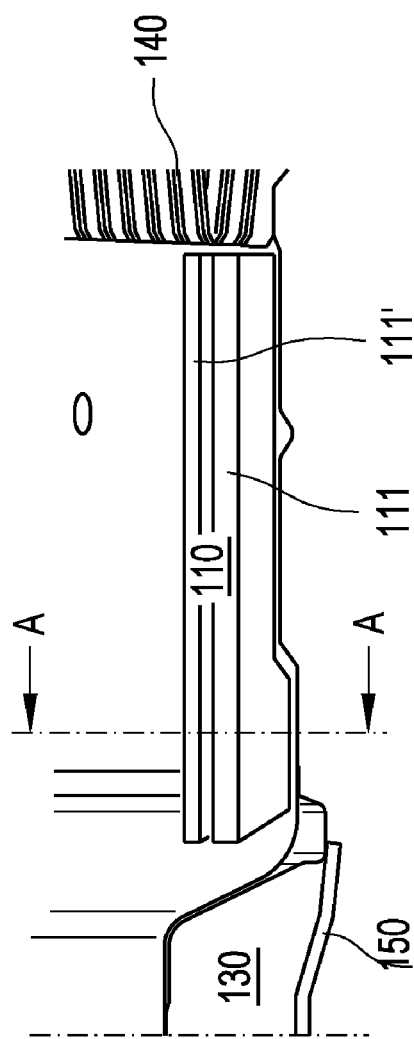
FIG. 2c illustrates an enlarged detail of the floor structure of the vehicle of FIG. 2a with the reinforcing element in the upper view, which is once more shown in the lower view in section A-A.
Figure 2C:
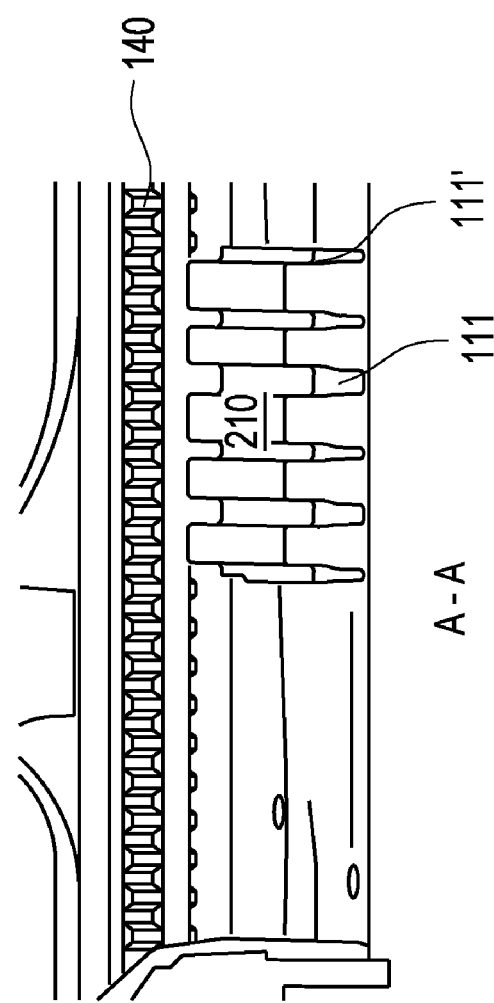

FIG. 2c shows an enlarged detail of the floor structure 100 of the vehicle of FIG. 2a with the reinforcing element 110 in the upper view, which is once more shown in section A-A in the lower view. Here, the waves 111,111' of the reinforcing element 110 between tunnel 130 and side member 140 are clearly visible. The member in this case also has a wave-shaped basic structure. Through the wave-shaped structure of the reinforcing element 110 a stiffness of the floor structure 100 is achieved, which imparts considerable resistance to the entering pole. The introduced loads are substantially dissipated in the region of the member 140 and the tunnel 130.

Figure 2D:
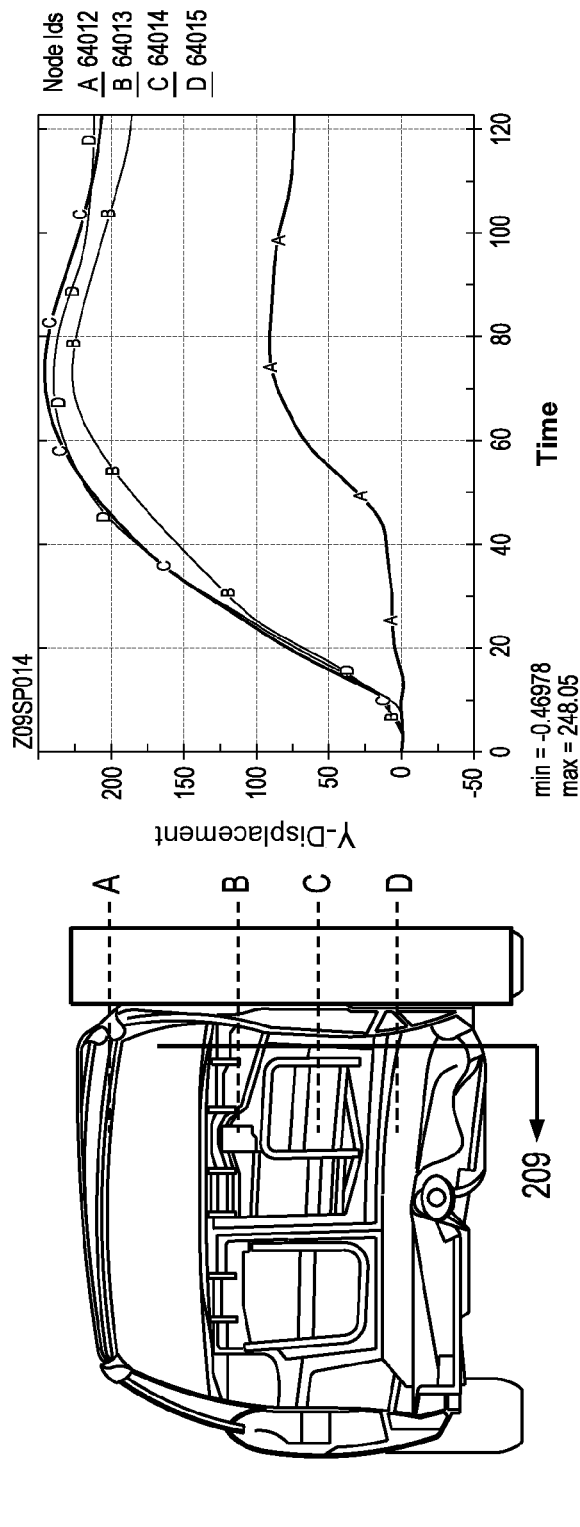
FIG. 2d illustrates the vehicle according to the invention of FIG. 2a with the floor structure before and after the test, as well as the displacements of the positions A-D along the B-pillar over the impact time in diagram form.
Figure 2D:
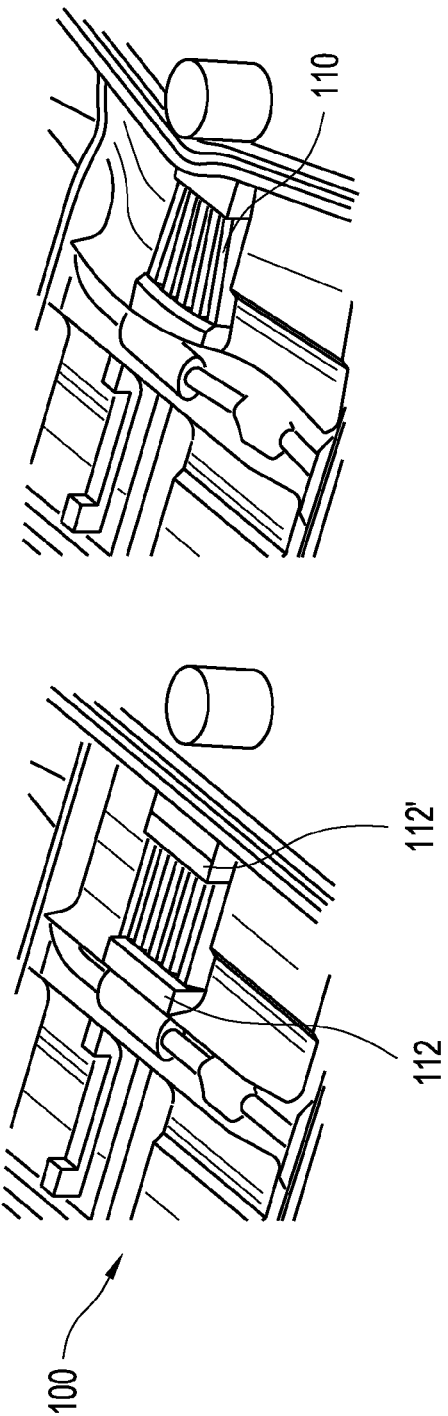

FIG. 2d shows the vehicle according to the invention of FIG. 2a with the floor structure 100 before and after the test, as well as the displacements of the positions A-D along the B-pillar over the impact time in diagram form. The intrusion of the body wall in this case amounts to only 209 mm, while the energy introduced is dissipated in the side member and tunnel region of the vehicle, as can be seen by the low deformation of the reinforcing element 110 and the course of the upper curves in the diagram. Neither the maximum values of the D-position nor the other positions are in the value range of the floor structure of a known vehicle.

Altogether this creates high transverse stiffness of the structure with relatively little weight. Through the measures, the maximum intrusions during the side-pole test are substantially reduced and are thus within the permissible range according to FMVSS214-MY09. During local overloading of the floor structure 100 the adjacent waves 111, 111' take over the load and thus avoid excessive deformations. The transmission of the pole forces to the structure 100 via door sill 160 and reinforcing element 110 as well as body floor 120 as far as the tunnel 130 and to the exhaust 300 occurs over a relatively large width. The energy dissipation thus occurs with greater efficiency than is customary to date. This type of construction thus meets the legal requirements according to the side-pole test.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A motor vehicle, comprising:
a body including a floor structure; and
at least one reinforcing element coupled to the floor structure and configured to reinforce the floor structure, wherein:
the reinforcing element comprises a wave-shaped design including a plurality of waves running across a longitudinal axis of the motor vehicle,
the reinforcing element includes reinforcements substantially running across an extension of the plurality of waves,
the floor structure comprises a vehicle tunnel running in vehicle longitudinal direction as well as side members formed on both sides on the vehicle, and each reinforcing element extends in a load path between a respective lateral member and the vehicle tunnel,
an exhaust is guided through the vehicle tunnel for absorbing deformation energy, and
a tunnel brace is provided which is supported by the legs of the vehicle tunnel and open towards the bottom, so that it pushes the exhaust upwards upon deformation of the vehicle tunnel.

2. A motor vehicle, comprising:
a body including a floor structure; and
at least one reinforcing element coupled to the floor structure and configured to reinforce the floor structure, wherein:
the reinforcing element comprises a wave-shaped design including a plurality of waves running across a longitudinal axis of the motor vehicle,
the reinforcing element extends in a load path between a respective lateral member and the tunnel,
the floor structure comprises a side member formed on both sides of the motor vehicle,
the floor structure comprises a vehicle tunnel running in a vehicle longitudinal direction and comprising tunnel legs,
the vehicle tunnel comprises an exhaust guided through the vehicle tunnel and configured to absorb deformation energy, and
the vehicle tunnel comprises a tunnel brace supported by tunnel legs of the tunnel and open towards a bottom such that the tunnel brace pushes the exhaust upwards upon deformation of the tunnel.

3. The motor vehicle according to claim 2, wherein each reinforcing element is formed as one piece with the floor structure.

4. The motor vehicle according to claim 2, wherein each reinforcing element is arranged on a body floor inside the motor vehicle.

5. The motor vehicle according to claim 2, wherein the waves have a profile that is box-shaped in cross section.

6. The motor vehicle according to claim 2, wherein each reinforcing element comprises reinforcements running across an extension direction of the waves.

7. The motor vehicle according to claim 2, wherein the lateral side members and the vehicle tunnel are reinforced against lateral impact.

8. The motor vehicle according to claim 2, wherein the floor structure comprises vehicle door sills formed on both sides of the vehicle and are reinforced against lateral impact.

* * * * *